July 18, 1933.                B. B. HARDING                1,918,468
            CONDENSED CATALOGUING AND PROJECTING MACHINE
                  Filed March 13, 1929        3 Sheets-Sheet 1
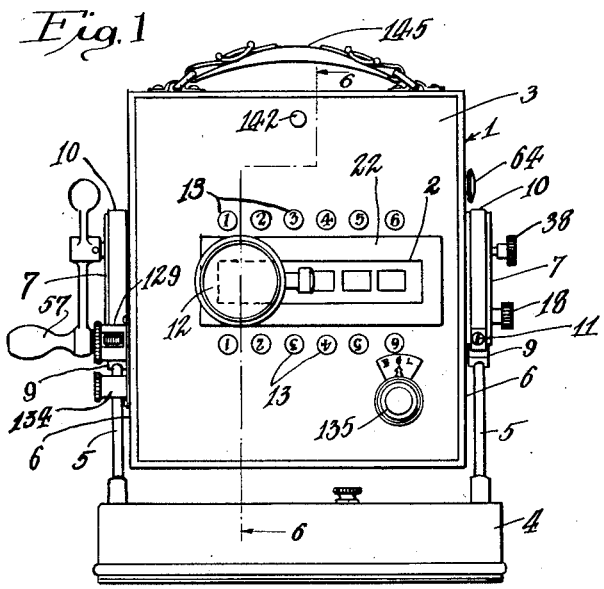
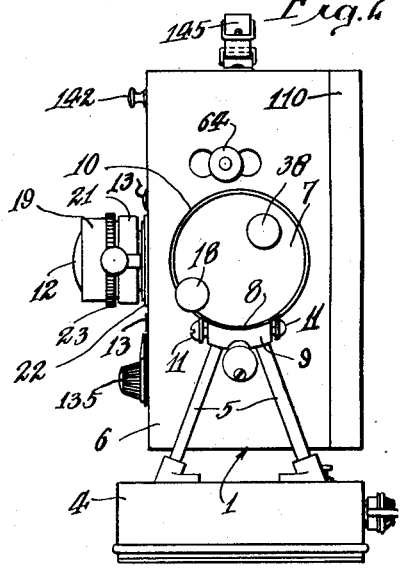
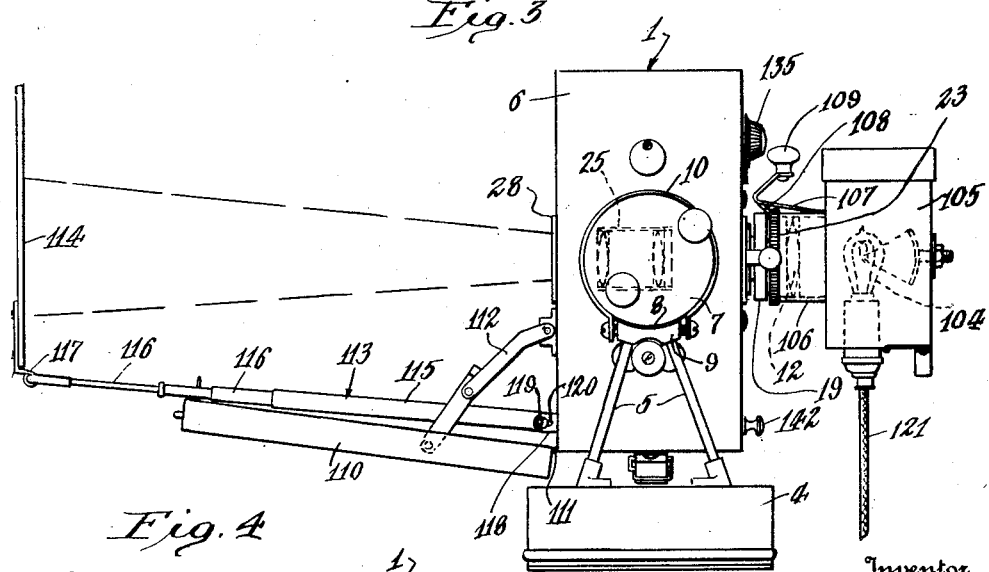
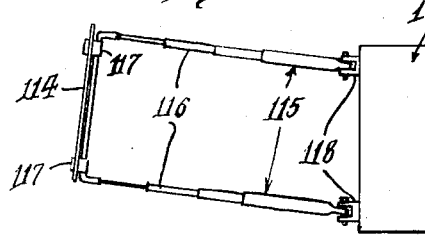
Inventor
Brooks B. Harding
By Lyon & Lyon
Attorneys

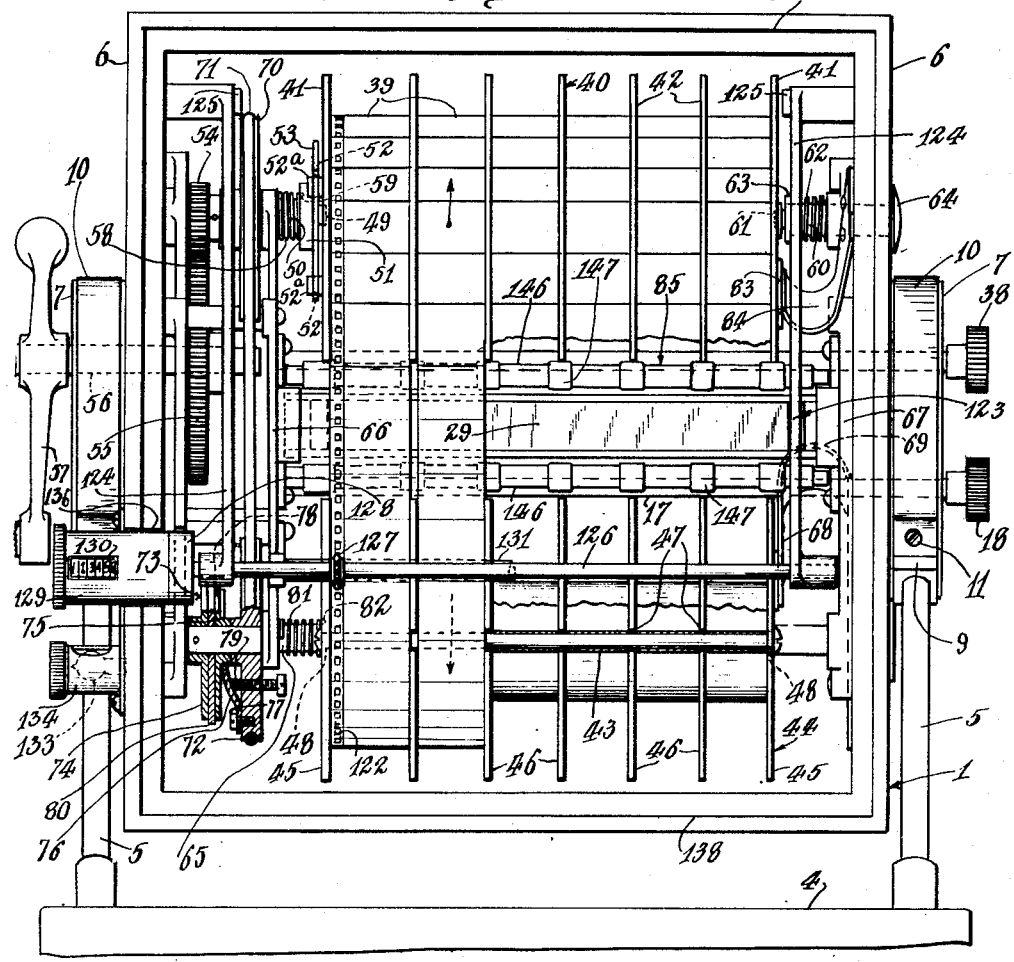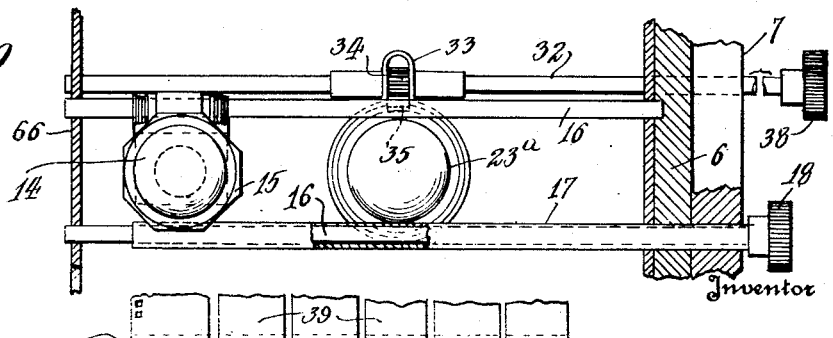

July 18, 1933.   B. B. HARDING   1,918,468
CONDENSED CATALOGUING AND PROJECTING MACHINE
Filed March 13, 1929   3 Sheets-Sheet 3
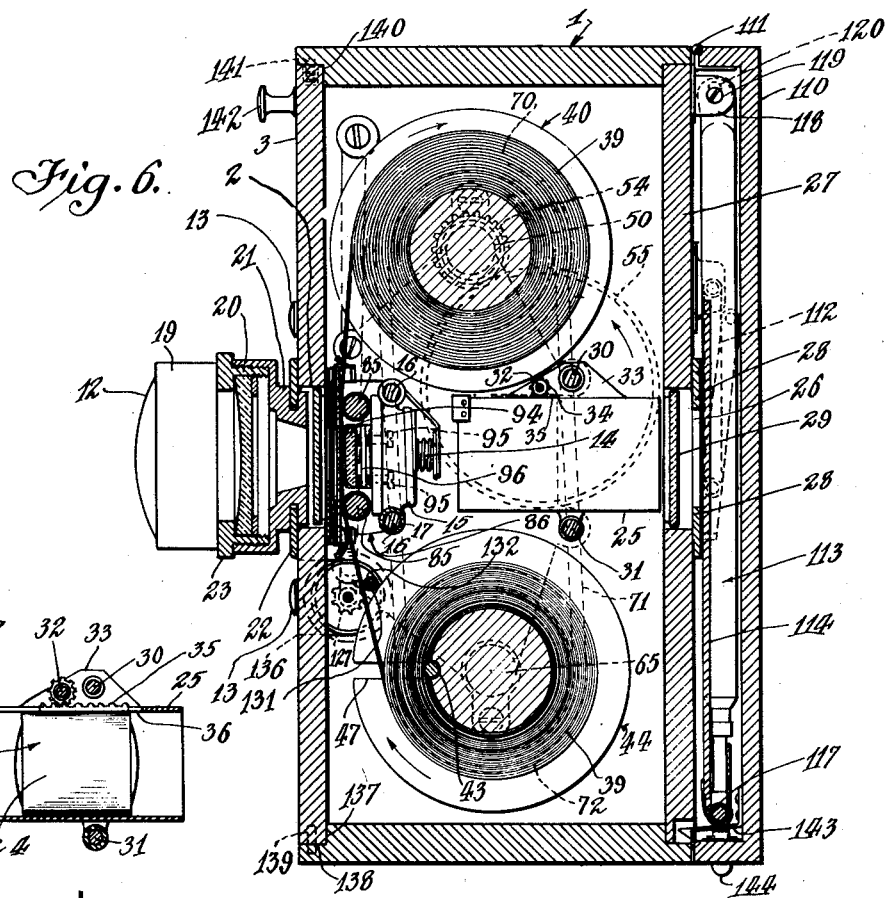
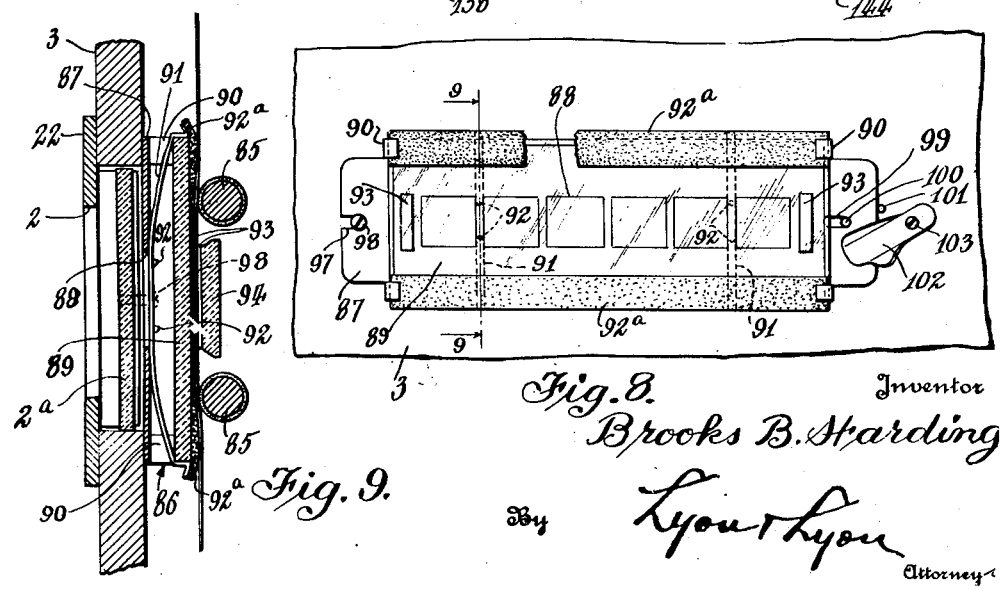
Inventor
Brooks B. Harding
By Lyon & Lyon
Attorneys Patented July 18, 1933

1,918,468

UNITED STATES PATENT OFFICE

BROOKS B. HARDING, OF LOS ANGELES, CALIFORNIA, ASSIGNOR TO GEORGE L. BROWN, SR., OF LOS ANGELES, CALIFORNIA

CONDENSED CATALOGING AND PROJECTING MACHINE

Application filed March 13, 1929. Serial No. 346,625.

This invention relates to apparatus, the purpose of which is to provide means for carrying in a condensed condition a great number of exhibits, and arranged so that the exhibits can be indexed, the apparatus being provided with means for bringing any exhibit quickly into view. While the machine may be employed for carrying small exhibits of any kind, it is most useful when employed for carrying a great number of photographs, such as the photographs taken on photographic films. These films are of small size and do not occupy much space and any picture can be readily found and brought to the observation point. A machine embodying this invention is particularly useful when employed to assist in the identification of suspected persons. When used for this purpose, the films carry photographs of known criminals. The machine is provided with means for bringing these photographs in succession past an observation point or sight opening where the particular picture to be viewed is displayed.

One of the objects of the invention is to provide an indicator which is driven automatically by the machine and in an accurate way, so that the number indicated by the indicator will correspond to the picture which is presented at the observation point.

In using such machine it is frequently desirable to display the exhibit in such a way that it can be viewed by a number of people at the same time. One of the objects of the invention is to construct the machine in such way as to enable this to be accomplished.

A further object of the invention is to construct the machine so that it can be readily tilted and held in different positions, so as to enable the exhibited picture to be held in a position convenient for the observer.

A further object of the invention is to provide means for carrying a plurality of films side by side, and also to provide means for readily placing the same in the machine. In other words, I provide a removable reel which can be used with the machine, the films on the reel being provided with special means to facilitate the connection of the films to the drum reel or relatively fixed reel that remains in the machine.

In the operation of the machine the films carrying the exhibits are moved past an observation point and one of the objects of the invention is to provide means for removing the dust from the films displayed, so as to increase the clearness of the pictures when viewed.

A further object of the invention is to improve the general construction of machines of this type.

Further objects of the invention will appear hereinafter.

The invention consists in the novel steps and combination of steps to be described hereinafter, all of which contribute to produce an efficient condensed cataloguing and projecting machine.

In the drawings,

Figure 1 is a front elevation of a machine embodying my invention.

Figure 2 is a side elevation of the machine shown in Figure 1.

Figure 3 is a side elevation of the machine and representing the same set up for use as a projection machine for projecting an enlarged image of the exhibit onto a screen, which screen forms a part of the apparatus and may be folded into the casing when not in use.

Figure 4 is a plan of a diagrammatic nature and particularly illustrating the extension frame that carries the folding screen on which the pictures may be projected.

Figure 5 is an elevation of the inner mechanism of the apparatus with the front wall of the machine removed, certain parts being broken away.

Figure 6 is a vertical section through the machine taken substantially on the line 6—6 of Figure 1, but this view is not upon the same scale as Figure 1.

Figure 7 is a longitudinal vertical section taken through the focusing lens which is carried in the casing of the machine and which is employed when using the machine for projecting pictures onto the screen.

Figure 8 is a plan of the tracker plate of the machine across which the films are guided and which is located at the sight opening through which the pictures may be observed. This view shows a portion of the inner face of the front wall of the casing and illustrates how the tracker plate may be set in place and removed. Certain parts of this view are broken away.

Figure 9 is a vertical section upon an enlarged scale taken about on the line 9—9 of Figure 8.

Figure 10 is a fragmentary view showing portions of the frame of the casing in vertical section, and particularly illustrating the means for guiding a lamp and the focusing lens so as to enable the same to be positioned opposite the film being exhibited, certain parts being broken away.

Figure 11 is a side elevation showing an anchor bar to which the ends of the films are attached and which is employed to facilitate detachably securing the ends of the film to the drum roll or drum reel of the machine.

Referring to the drawings, 1 represents a casing which is constructed like a camera box and this casing is preferably supported on a stand for movement on a horizontal axis. This enables the casing to be tilted as may be desired to facilitate viewing the exhibits or pictures that are located opposite a sight opening 2 that is formed in the forward wall or front plate 3 of the box. This sight opening 2 is in the form of a horizontal slot extending across the front plate 3, and when the casing is in its upright position this slot is at substantially the same level as the horizontal axis on which the machine can tilt or rotate. Any suitable means may be employed for supporting the casing to permit of this tilting and rotation. I prefer, however, to provide the machine with a stand comprising a base 4 and end brackets or frame members 5 in the form of A frames that extend upwardly and support the casing at its end walls 6. I prefer to provide the end walls 6 of the casing with relatively large trunnions 7, the under sides of which lie on a concave face 8 that is formed at the upper end of each A frame or bracket 5, at which point the block 9 is employed and forms the upper end of the A frame. This face 8 operates as a rudimentary socket for the trunnion and each trunnion is held on its socket by a friction band 10 that passes around it, the ends of the band being secured by adjusting screws 11 to the end faces of the socket block 9.

By taking up either or both of the screws 11, it will be evident that the friction resistance to tilting the casing on its horizontal axis can be very nicely adjusted.

Movably mounted at the sight opening 2 so that it can be moved to any point along the slot, I provide an observation lens 12 which constitutes a magnifying glass for magnifying the picture on the film which is being displayed at the sight opening, and above the slot 2 numbered points 13 are provided which are equidistant from each other and which indicate the different positions the lens 12 should be held in so as to enable it to align with the different films carried in the machine.

The interior of the casing may be provided with suitable means for illuminating the films, and particularly the film being displayed. In Figure 10, I illustrate means for this purpose, consisting of a small lamp 14 supported in a frame 15 constructed as a carriage to slide on a guide which is disposed transversely of the casing and immediately back of the sight opening 2. The guide for this lamp is in the form of two horizontal guide bars 16 on which the frame 15 slides. The frame 15 is connected to the inner end of a tubular adjusting rod 17, the end of which extends through one of the end walls 6 and carries a knob 18 for shoving the lamp frame 15 along the guide.

The lamp 14 may be supplied with current through a flexible electric cord, not illustrated.

The observation lens 12 is carried in a suitable lens casing 19 (see Fig. 6), which is of the usual cylindrical form, and this casing 19 projects out from the box or casing 1, being secured in a removable screw plug 20 that screws into a slide block 21 that is guided to slide along the slot 2 by engaging the edges of a slot plate 22 in which the slot is formed. The plug 20 is provided with an enlarged milled collar 23 to facilitate its being put in place. This tubular lens casing 19 is useful in setting up the machine for projecting a picture from the film onto a screen. If desired, the screen can be distant from the device and held in any suitable manner at the proper focusing distance from the machine. I prefer, however, to construct the screen so that it is a part of the complete apparatus, and also construct it so that it can be held folded in the casing when the apparatus is merely being used for observation purposes. When it is desired to project pictures, however, the screen frame is extended, as illustrated in Figure 3.

In order to adapt the machine for projecting pictures in this way within the casing, I provide a focusing lens 23ª (see Fig. 7), which "lens" may comprise one or more lenses carried in a tubular casing or barrel 24 that is guided to slide longitudinally in a tubular guide 25. This "lens" guide 25 with its lenses constitutes a lens assembly, and is also guided to move parallel with the sight opening 2 and in line between the slot 2 and a projection slot or opening 26, which is formed in the rear wall 27 of the machine. This projection opening is, of course, in the form of a slot, which may be covered by a slotted cover plate 28 secured to the outer side of the wall 27.

In the slot a glass plate 29 may be mounted. The guide for the lens tube 25 consists of two cross bars 30 and 31 parallel with each other and extending parallel with the front and rear walls of the casing. I provide means for enabling the focusing lens to be slid along these guide rods to position the same in line with the film, the pictures of which are being projected. For this purpose I provide a stem 32, which slides through one of the end walls 6 (see Fig. 10). This stem 32 is provided with means cooperating with it within the casing to enable it to focus the focusing lens. Any suitable means may be provided to accomplish this. In the present instance the inner end of the stem is rotatably mounted in an extension 33 that projects radially from the cylindrical wall of the tube 25 and carries a pinion 34 in this extension, that meshes with a rack 35 extending longitudinally on the upper face of the lens barrel 24 (see Fig. 7). The rack 35 projects out through a slot 36 in the tubular lens guide 25 (see Fig. 7).

It will be evident that by pushing or pulling upon the knob 38 on the end of the stem 32, the lens guide 25 can be moved to and fro along the projection opening 26, and by rotating the stem the focusing of the lens can be accomplished.

In order to support the web carrying the exhibits, I provide reels within the casing, one of which is removable. In the present instance, instead of having a single web, I provide a plurality of photographic films 39, such as employed in producing motion pictures. These films are portably carried on a removable reel 40, said reel consisting of a tubular body with end heads 41 and intermediate separator heads 42 that separate the coils of film. The loose ends of the films 39 are attached to an anchor bar 43 (see Fig. 11). The lower reel 44, as illustrated in Fig. 5, I call the drum reel or relatively fixed reel. This reel is permanently mounted in the casing. Its body is constructed very similar to the reel 40, that is to say, it has end heads 45 and intermediate heads 46 that divide the films from each other. The intermediate heads 46 have radial slots 47 to receive the anchor bar 43 with a lateral movement, and the end heads 45 have openings at the points 48 to enable the bar to be shifted longitudinally first in one direction and then in the other direction to lock the bar in place. The removable or portable drum 40 is held in place at its left head 41, as indicated in Fig. 5, by a reduced tip 49 that is received in a corresponding socket in this head. The tip 49 is formed on the end of a stub shaft 50 that carries a loose collar 51, and this collar is formed with driving sockets 52 that are received on corresponding pins 52ª in the adjacent head 41 to enable the driving pins to drive the reel or drum. The driving sockets 52 are formed in a disc 53 that is rigid with the collar 51.

When the machine is in operation the stub shaft 50 is rotated through the medium of a pinion 54 carried by it and meshing with a gear 55 carried on a shaft 56 having a crank 57 outside of the machine for rotating it. This shaft 56 passes through the adjacent end wall 6 of the machine. The collar 51 is driven by means of a one-way drive connection which will only drive the reel 40 in the direction indicated by the arrow in Fig. 5, that is to say, in a direction which will wind the films onto it. Any suitable one-way connection may be used for this purpose. In the present instance I employ a light wire coil 58, which is disposed around the stub shaft 50 adjacent the collar 51, one end of the coil being secured at 59 to the collar. This coil has light frictional contact with the stub shaft, and when the stub shaft is rotated in the direction indicated by the arrow the coil tightens itself on the stub shaft and rotates the reel 40.

The reel 40 is held in place and properly centered at its right end, as illustrated in Fig. 5, by means of a sliding stem 60 that slides through the adjacent end wall of the casing, the end of the said stem being received in a socket 61 in the adjacent head of the reel. A coiled spring 62 around this stem thrusting against a collar 63 on the stem holds the end of the stem in engagement with the socket. By inserting one's nails under the edge of a head 64 on the outside of the casing, the stem can be retracted when it is desired to release the reel or put it in place.

The drum reel 44 is permanently mounted on a shaft 65, the ends of which are suitably mounted in the frame members 66 and 67. When the films are being wound onto the reel 40, the rotation of the drum reel 44 is resisted by a friction brake 68 held by force of a spring 69 against the right end head of the reel (see Fig. 5).

In order to enable the reverse movement of the crank 57 to drive the drum reel 44 in order to wind the films onto it from the other reel, I provide a connection which has lost motion or slip in it. This is necessary to provide for the changing effective diameter of the coils of film and, at the same time, insure sufficient tension in the films. For this purpose the stub shaft 50 is provided with a pulley 70 carrying a round belt 71 that runs around a similar belt pulley 72 on the shaft 65. This pulley 72 is loose on the shaft 65, but transmits its motion through a friction clutch 73 to the shaft 65. This friction clutch may be of any desired construction, but in the present instance the clutch consists of a disc 74 rigidly pinned to the shaft 65 and cooperating with a driving disc 75 loose on the shaft 65 and pressed toward the driven disc 74 by an adjustable plate spring 76. This plate spring is anchored to the adjacent side of the pulley by small screws 77 and its outer end is provided with laterally bent points 78 that are received in sockets in the outer face of the disc 75. An adjusting screw 79 is provided in the pulley 72 for adjusting the pressure of this spring against the disc 75. If desired between the discs 74 and 75 a rubbing disc 80 of fiber may be provided to develop friction and take up wear.

The drum reel 44 is not rigid on its shaft, but I provide a one-way drive connection similar to that employed for driving the other reel. For this purpose I provide a coiled spring 81 (see Fig. 5), which encircles the shaft of the reel 44 bearing against the same lightly, and the end of this spring is secured at 82 to the end of the drum. If the direction of rotation is such as would rotate the reel 44 in the direction indicated by the arrow on it in Fig. 5, the spring would tighten up on the shaft and will drive the reel. For the opposite direction of rotation it will not drive the reel.

When the drive is in the direction indicated by the arrow on the reel 44, which would wind the films onto it, the resistance of the reel 40 is maintained by a small brake 83 (see Fig. 5), which is carried on a spring 84.

As the films 39 pass between the reels they will glide across the observation slot 2. In order to accomplish this, I provide two parallel guide rollers 85 (see Fig. 6). These rollers guide the films across a tracker plate construction 86 (see Fig. 9). This tracker plate construction is such that it provides a narrow guide slot between plates of glass through which the films pass but without being subjected to pressure. In addition to this, I provide means for effectively removing the dust that may adhere to the films. In this connection, referring to Figs. 8 and 9, the construction includes a tracker plate 87 having a plurality of windows 88 arranged in a row and running longitudinally with the observation slot 2. The films track across these windows, respectively.

The guiding means for the films at this point include a glass plate 89 held on the face of the tracker plate 87. The corners of this plate are held in retaining fingers 90, which are bent up from the corners of the tracker plate 87. The tracker plate is provided with a plurality of bow springs 91 that are secured, as at 92, to the tracker plate. These springs press the glass plate 89 outwardly against the retaining clips 90 and hold the same in place. The edges of the glass plate 89 are provided with elongated wipers 92ª of velvet or similar material forming a cushion convex on the side toward the film, so as to wipe it gently as it passes. The slot 2 is also closed by a glass plate 2ª.

Near the ends of the glass plate 89 two bearers 93 are provided, which may be formed of strips of film or a splint of glass about twice the thickness of the films carrying the pictures. On these bearers a back plate 94 is held by means of two set screws 95 (see Fig. 6) which are mounted in the end frames 96 that support the ends of the back plate. These end frames are located beyond the ends of the observation opening 2.

The tracker plate 87 is constructed so that it can be readily detached. For this purpose it is provided at one end with a slot 97 that is received under the head of a screw 98 fastened on the inner face of the front wall 3 of the casing, the other end of the tracker plate 87 being provided with a slot 99 that receives a pin 100 projecting out from the inner face of the forward wall (see Fig. 8).

The tracker plate is put in place by engaging the slot 97 under the head 98 by moving the plate into position from the right, as viewed in Fig. 8, and after the slot 97 is engaged in this way the plate is then moved into position against the face of the front wall 3. In doing so, the right hand edge of the plate comes against a pin 101 projecting out from the face of this wall 3, and this pin keeps the tracker plate in proper alignment. The tracker plate is held against outward movement by a small latch 102 mounted on a pivot screw 103.

When it is desired to employ the apparatus for projecting the picture from any exhibit or "frame" of a film onto a screen to enable the picture on the screen to be observed readily by a number of persons at once, I employ a lamp, the filament of which is indicated at 104 (see Fig. 3). This lamp is carried in a lamp box 105 provided with means for attaching it over the tubular lens casing 19. This lamp box, therefore, has a tubular extension 106 that telescopes over the lens casing 19 and is provided with a latch in the form of a spring 107 having a dog 108 that engages over the inner face of the shoulder or collar 23. This catch can be controlled by a handle 109. By reason of the fact that the projection lens produces an inverted image of the projected picture, it is necessary to turn the casing over into an inverted position (see Fig. 3 as compared with Fig. 2). This inverting of the casing is, of course, permitted by the trunnions 7.

In this position it is evident that the lens 12 can be slid along carrying with it the lamp box 105, so as to bring it in line with any film, a picture of which is to be projected. At the same time the projection lens 23ª can be moved into alignment with the lens 12. In order to facilitate this projection operation, the casing is provided with an outer drop wall or drop cover 110 secured to the casing by hinges 111, which enable this cover to drop down (see Fig. 3), and in the dropped position the cover 110 operates as a shelf supported on jointed links 112. When the cover 110 is dropped down in this way, it will support an extensible and foldable frame 113 that supports a screen 114 on its outer end. This frame 113 comprises two parallel arms 115 formed of telescoping sections 116 that pull outwardly so as to hold the screen 114 at a distance from the casing. The screen 114 is secured to the outermost sections of the extensible frame 113 by hinges 117. This enables the screen to fold down onto the telescoping arms 115, so that the frame and screen can be held neatly folded inside the casing when desired, as indicated in Fig. 6.

The inner ends of the arms 115 are connected to the inner rear wall 27 of the casing by means of two brackets 118, to which they are attached by pins 119, each pin being received in slots 120 in the brackets. These slots are employed as the preferred means for enabling the frame 113 to be shifted laterally, as indicated in Fig. 4, to enable it to align more perfectly with the films that are located near the ends of the reels.

The lamp filament 104 is supplied with electric current through a flexible electric cord 121, which permits the lamp box to be moved to and fro with the lens 12.

It should be understood that the different exhibits or "frames" carried on the films carry index numbers, that is to say, each picture on a film has its own individual number. I provide an indicator with numbered dials, and I provide automatic means for advancing these dials, so that the number set up at the indicator corresponds to the index number on a horizontal row of pictures on the films. I prefer to drive this indicator proportionally to the linear movement of the films, as this produces a very accurate synchronization of the counter or indicator with the films.

In order to accomplish this, I use for one of the films (for example, the left hand film as illustrated in Fig. 5), a film that has the usual perforations 122 that are commonly used in projection exhibiting for feeding the film through the projecting machine, and I provide means for engaging these perforations to actuate the indicator. I also mount the indicator so that it is movably supported to enable it to be moved away at will to facilitate the placing and removing of the films in the casing. As illustrated in Fig. 5, for this purpose I provide an indicator frame 123 that comprises two side arms 124 supported on pivot bolts 125 on the end walls of the casing, and the free ends of these arms are connected by a cross shaft 126 that carries a sprocket wheel 127 in line with the perforations 122.

On the outer side of the left hand arm 124, I mount an indicator carrier sleeve 128 carrying an indicator 129 of cylindrical form. The casing 129 is provided with a window 130 in one side, through which the numbers on the dials of the indicator can be seen. The casing 129 swivels in the carrier 128 so that it can be twisted on its axis to bring the window 130 into two working positions, so that the numbers can be readily seen when the apparatus is in the condition indicated in Figs. 1 and 2, when being used merely for observing the pictures through the lens 12. It also enables the dials to be readily seen when the apparatus is being used for projecting pictures, as indicated in Fig. 3. In order to insure effective engagement of the teeth of the sprocket wheel 127 with the perforations 122, I prefer to provide the interior of the casing with a cross bar 131 (see Fig. 6), which is preferably in the form of a roller mounted in the frame to rotate on its own axis. This bar or roller is provided with a circumferential groove 132 opposite the sprocket wheel, to provide clearance for the teeth of the sprocket wheel.

In order to adapt the device for use at night, I may provide a small electric lamp 133 (see Fig. 5), which is mounted in a swiveling tubular housing 134, which swivels on its own axis on the end wall of the casing adjacent the indicator or counter.

If desired the electric lights employed with the apparatus may be supplied with current from a battery carried within the casing or within its base 4. Any suitable wiring arrangement may be employed and, if desired, the side of the casing can be provided with a switch 135. In one position of this switch the battery would be connected with the lamps and in another position it could be connected with a plug connected with an ordinary electric lamp socket. In the mid position of the switch, as shown in Figure 1, the current is shut off both from the battery and the lamp socket.

Referring again to the indicator frame 123, it will be noted that I do not find it necessary to employ any spring for holding this frame in a position to maintain the sprocket wheel 127 in proper engagement with the left hand film (see Fig. 5). In order to avoid the necessity for employing a spring for this purpose and also to provide clearance for the indicator holder 128, I provide the adjacent edge of the end wall 6 of the casing with a deep slot 136 in which the holder is received. The bottom of this slot or notch limits the inward movement of the frame 123. The frame is held in this position by the front cover plate 3 when the same is set in place. This front cover plate is received at its lower edge 137 in a rabbet groove 138 provided with pins 139 received in corresponding sockets in the lower edge of the cover plate. The upper edge of the cover plate is seated in a rabbet groove 140 provided with any kind of a yielding snap holder 141. By pulling out on the thumb head 142 the cover can be disconnected at will.

A spring catch 143 detachable by means of a push button 144 is provided at the free edge of the drop cover 110.

The casing may be provided with a leather strap handle 145 to facilitate carrying it about.

Referring again to the guide rollers 85 over which the films pass, it will be noted that these rollers are formed with reduced necks 146 between necks 147 of larger diameter. This enables the films to bear on the rollers only at their edges. This prevents scratching the film.

The mode of operation of the machine will now be briefly outlined.

In connection with the index numbers of the exhibits or "frames" on the films, it should be understood that all of the "frames" in the same horizontal row have the same general index number. In addition to this, each picture has another index number, which would be 1, 2, or 3, etc. to correspond to the particular number at 13 (see Fig. 1) with which the particular film is aligned.

In using the apparatus for observation purposes suppose, for example, that an index number on an exhibit to be observed was the number "3—1711". In order to observe this exhibit the lens 12 would be moved over (see Fig. 1) into alignment with the third film, as indicated by the number 3 above and below the observation slot. Having brought the lens 12 into this position, the crank 57 would then be rotated until the index number 1711 appeared in the indicator. When this occurs, the desired exhibit would be in position opposite the lens 12. When using the device for projecting the pictures from the films, the drop cover 110 should be let down, as indicated in Fig. 3, and the frame 113 extended so as to hold the screen 114 in an upright position. Before doing this, however, the casing would be rotated into an inverted position. This would bring the lens 12 on the right side. This lens is then moved along its slot to position opposite the film, the picture of which is to be projected. The lamp casing 105 would then be attached in place and the stem 32 would then be operated by means of its knob 38 to align the focusing lens 23ª with the lens 12. By rotating the stem 32, the focusing of the image would be accomplished.

By reason of the fact that the lens assembly 25 would project an image in an upright position on the screen 114, the interposition of the lens 12 between the lamp and the lens assembly 25 (see Figure 3) would operate to invert the image on the screen. For this reason, it is necessary if using a standard lens assembly 25, to provide for the rotation of the casing on a horizontal axis in order to have the pictures on the screen upright.

In using the apparatus for observation purposes, the casing can be rotated on its trunnions into any desired tilted position to suit the convenience of the person using the apparatus.

In using the apparatus for observation purposes, the window 130 of the indicator would be adjustably rotated on its axis to enable the numbers on the dials to be seen. When using the device for projecting, this window would be rotated around on the axis of the indicator, so as to expose the dials on the side toward the operator of the machine. When using the apparatus for observation purposes, the stem 17 would be operated to bring the lamp 14 back of the film being inspected, so as to illuminate the exhibit from the rear as a transparent picture.

The control and movement of the films is accomplished as follows: When using the apparatus for observing exhibits through the lens 12, the crank 57 would be rotated in a direction to cause the film to travel upward in the direction indicated by the arrow on the upper reel in Fig. 4. By rotating the stub shaft 50 in this direction, it operates through the one-way drive connection 58 to drive the upper reel in this direction. When the upward movement starts from the lower reel, and so long as the films being drawn off of the lower reel rotate the lower reel at a lower velocity of rotation than the shaft 65, the one-way drive connection consisting of the coiled spring 81 will not clutch the reel to the shaft 82, and the lower reel will rotate freely (except for the friction of its brakes 68 that gives desired tension). After the diameter of the wrapped films on the upper reel becomes greater than the diameter of the wrapped films on the lower reel, the lower reel will commence to rotate at a higher velocity than the shaft 82 and this will tighten spring 81 on shaft 82; this causes the lower reel to drive shaft 82, and when this occurs, the slipping of belt 71 prevents it from driving the lower reel.

In winding the films onto the lower reel, as indicated in Fig. 4, the lower reel would be rotated in the direction indicated by the dotted arrow upon it. This is accomplished by rotating the crank 57 in a reverse direction. By doing this, the belt 71 drives the pulley 72, which, operating through the friction clutch 73, drives the shaft 65 in the proper direction to drive the lower reel through the one-way connection 81.

The clutch and the one-way drive connections constitute a compensating device to insure that the reel paying off the films can rotate at different angular speeds to correspond with the changing diameter of the coil upon it. In this connection it should be understood that when the film is nearly all paid off from the reel, the reel would rotate at a much faster angular velocity than the full reel, and vice versa.

The presence of the friction clutch 73 is advisable because it prevents any injury to the apparatus in case the belt 71 should be too tight on its pulleys. This belt and its pulleys constitute a yielding drive and while the belt operates to take a considerable part of the tension to drive the pulley from which the films are being paid off, it relieves the films of considerable tension. At the same time it is not a positive drive, and, therefore, permits the paying off reel to rotate at sufficient speed to pay off the films.

The use of the end bar 43 facilitates the attachment of the films in the machine. The films are normally carried on the upper reel 40, which is a removable reel, and when this reel is put in place by withdrawing the stem 60, the bar 43 carried on the ends of the films is properly placed in the slotted heads of the drum reel.

In order to facilitate the placing of the films in the casing and aligning them across the tracker plate, the front cover plate 3 should be removed.

When removed in this way the cover plate, of course, carries with it the tracker plate and the glass plate 89 carrying the wipers 92.

It is understood that the embodiment of the invention described herein is only one of the many embodiments this invention may take, and I do not wish to be limited in the practice of the invention, nor in the claims, to the particular embodiment set forth.

What I claim is:

1. In apparatus of the kind described, the combination of a casing having a wall with a sight opening therein, and having a projection opening in the opposite wall, means for supporting a plurality of films in the casing with means for guiding the same past the sight opening, an observation lens movably mounted at the sight opening to move transversely of the films to enable the same to be positioned opposite any film, a projection lens movably mounted within the casing and capable of being moved into position opposite any film, and means for mounting a projection lamp on the outside of the casing in line with the observation lens to project images from the films through the projection opening to a point outside of the casing.

2. In apparatus of the kind described, the combination of a casing having a wall with a sight opening therein, and having a projection opening in the opposite wall, means for supporting a plurality of films in the casing with means for guiding the same past the sight opening, an observation lens having a lens-casing guided on the main casing to move along the sight opening to enable the same to be positioned opposite any film, a projection lens movably mounted within the casing and capable of being moved into position opposite any film, a projection lamp and means for securing the same on the outer end of the said lens-casing and in line with the positioned projecting lens to project an image from one of the films through the projection opening to a point outside of the casing.

3. In apparatus of the kind described, the combination of a casing having a wall with a sight opening therein, and having a projection opening in the opposite wall, means for supporting a plurality of films in the casing with means for guiding the same past the sight opening, an observation lens having a tubular lens-casing guided on the main casing to move along the sight opening to enable the same to be positioned opposite any film, a projection lens movably mounted within the casing and capable of being moved into position opposite any film, a projection lamp having a casing with a tubular extension for securing the same on the outer end of the tubular lens-casing and in line with the positioned projecting lens to project an image from one of the films through the projection opening to a point outside of the casing.

4. In apparatus of the kind described, the combination of a casing having a wall with an elongated sight-opening therein and having an elongated projection opening in its opposite wall, means for supporting a plurality of films with means for guiding the same past the said sight-opening, an observation lens guided to slide longitudinally to and fro on the casing adjacent the sight opening to bring the same opposite any film to enable the operator to find a given picture, means within the casing for illuminating the films, a projection lens adjacent the projection opening with means for guiding the same along the slot to enable the same to be positioned opposite any film and opposite the said given picture, and means for connecting a projection lamp to pass its rays through the observation lens and cooperate with the same and the projection lens to project an image from the given picture through the projection opening to a point outside of the casing.

5. In an apparatus of the kind described, the combination of a casing having a wall with an elongated sight-opening therein and having an elongated projection opening in its opposite wall, means for supporting a plurality of films with means for guiding the same past the said sight-opening, an observation lens having a casing guided to slide longitudinally to and fro on the first named casing adjacent the sight opening to bring the same opposite any film to enable the operator to find a given picture, means within the casing for illuminating the films, a projection lens adjacent the projection opening with means for guiding the same along the opening to enable the same to be positioned opposite any film and opposite the said given picture, a projection lamp casing with means for attaching the same on the observation lens casing in line with the observation lens to pass its rays through the same and project an image from the given picture through the projection opening, and an extensible folding frame connected with the casing on the side of the same adjacent the projection opening, with a screen carried by the same to receive the projected image.

6. In apparatus of the kind described, the combination of a casing having a wall with an elongated sight-opening therein and having an elongated projection-opening in the opposite wall, means for supporting a plurality of films within the casing and for guiding the same past the sight-opening, an observation lens guided to slide longitudinally to and fro on the casing adjacent the sight-opening to bring the same opposite any film, a projection lens within the casing between the said openings, guiding means for guiding the projection lens longitudinally of the projection opening, a stem connected with the projection lens and extending through the wall of the casing to the exterior to enable the projection lens to be aligned with the observation lens, a projection lamp and means for mounting the same in alignment with the observation lens to cooperate with the same and the projection lens to project an image from one of the films through the projection opening to a point outside of the casing.

7. In apparatus of the kind described, the combination of a casing having a wall with a sight-slot therein and having a projection slot in alignment with the sight-slot in the opposite wall, an observation lens with means for guiding the same along the observation slot, guide-bars extending through the casing between the said slots, a projection lens guided on the said guide bars with means for moving the same along the guide bars operable from the exterior of the casing, a projection-lamp, and means for mounting the same in line with the observation lens to enable the same to cooperate with the projection lens to project an image from one of the films through the projection slot to a point outside of the casing.

8. In apparatus of the kind described, the combination of a casing having a wall with a projection slot therein, said casing having a drop-cover associated with the said projection slot, a folding and extensible frame housed under the said drop-cover and having a connection at one end to the casing, enabling the same to be extended from the casing when the drop-cover is in its dropped position, a projection screen carried by the said connection for the frame, said projection frame having lost motion means permitting the same to be swung laterally to hold the screen in different laterally disposed positions to bring the same opposite different parts of the projection slot.

9. In apparatus of the kind described, the combination of a casing having a wall with a projection slot through the same, means for supporting a plurality of films within the casing and for guiding the same transversely to the axis of the projection slot, a projection lens with means for guiding the same and for moving the same into position opposite the location of any of the films, a folding extension frame supported on the wall of the casing with a screen carried by the same to receive a projected image, said extension frame having arms with means for flexibly connecting the same to the said casing enabling the frame to be shifted laterally to hold the projection screen in different positions corresponding to the different films.

10. In apparatus of the kind described, the combination of a casing having a wall with a slot therein, means for supporting a plurality of films and for guiding the same within the casing transversely to the said slot, a lens casing with a focusing lens with means for guiding the same in the casing to enable the same to move longitudinally of the slot, a stem connected with the lens casing and extending through a wall of the casing to enable the same to be shoved in and out through the wall to position the lens casing opposite the location of any film, said lens casing having means for focusing the focusing lens by rotating said stem.

11. In apparatus of the kind described, the combination of a casing having a wall with a slot therein, means for supporting a plurality of films and for guiding the same within the casing transversely to the said slot, a lens casing with a focusing lens with means for guiding the same in the casing to enable the same to move longitudinally of the slot, a stem connected with the lens casing and extending through a wall of the casing to enable the same to be shoved in and out through the wall to position the lens casing opposite the location of any film, said lens casing having means for focusing the lens by rotating said stem, a stem connected with the lens casing and extending through a wall of the casing and means cooperating with the stem to enable the stem to adjust the position of the focusing lens along the said slot, and to focus the lens.

12. In apparatus of the kind described, the combination of a casing having a wall with a slot therein, a guide within the casing extending longitudinal with the slot, a lens carriage mounted to slide on the guide and carrying a focusing lens, a stem connected with the carriage and extending through a wall of the casing for moving the lens carriage longitudinally of the slot, and means actuated by the stem for focusing the lens.

13. In apparatus of the kind described, the combination of a stand in the form of two oppositely disposed frame-members, a casing located between the frame-members and having trunnions on its end walls rotatably supported on the frame members, one of the side walls of said casing having an observation opening and the opposite side wall having a projection opening, means for supporting a plurality of films in the casing and for guiding the same across and adjacent to the observation opening, a projection lens within the casing, and means for holding the same in different positions located along the projection slot, a projection lens casing, means for mounting the same on the exterior of the casing opposite the said observation slot, and a screen for receiving images cast from any of the said films.

14. In apparatus of the kind described, the combination of a stand in the form of two oppositely disposed frame-members, a casing located between the frame-members and having trunnions on its end walls rotatably supported on the frame-members, one of the side walls of said casing having an observation opening and the opposite side wall having a projection opening, means for supporting a plurality of films in the casing and for guiding the same across and adjacent to the observation opening, a projection lens within the casing, and means for holding the same in different positions located along the projection slot, a projection lens casing, means for mounting the same on the exterior of the casing opposite the said observation slot, an indicator mounted in one of the end walls of the casing, with means for driving the same to advance as the films advance, said counter having a window in its wall through which the counter dials may be observed, and means for mounting the counter casing at said end wall to enable the said window to be moved into different positions so that the counter can be read when the casing is in one position and in an inverted position.

15. In apparatus of the kind described, the combination of a stand, a casing having end walls with trunnions, means for frictionally clamping said trunnions on said stand to enable the casing to be held in an upright position or in an inverted position, a focusing lens within the casing with means for guiding the same longitudinally in the casing between the said trunnions, a stem extending through one of said trunnions and connected with the focusing lens for focusing the same and for moving the lens into different positions within the casing, said casing having a side wall with a sight-slot therein, said casing having an opposite side wall with a projection slot therein, and means within the casing for supporting a plurality of films and for guiding the same transversely to the said sight-slot.

16. In apparatus of the kind described, the combination of a stand, a casing having end walls with trunnions, means for frictionally clamping the same to enable the casing to be held in an upright position or in an inverted position, a focusing lens within the casing with means for guiding the same longitudinally in the casing between the said trunnions, a stem extending through one of said trunnions and connected with the focusing lens for focusing the same and for moving the lens into different positions within the casing, said casing having a side wall with a sight-slot therein, said casing having an opposite side wall with a projection slot therein, means within the casing for supporting a plurality of films and for guiding the same transversely to the said sight-slot, an indicator having a substantially cylindrical barrel mounted on one of the end walls of the casing with the axis of the barrel substantially parallel with the axes of said trunnions, said barrel having a window therein to display the dials of the counter, and means for mounting the barrel for rotation on its longitudinal axis to alter the reading position of the indicator.

17. In an apparatus for exhibiting a plurality of films having indexed pictures thereon and holes in an edge thereof, the combination of a casing having an observation slot in the wall thereof, a pair of reels mounted in the casing, means for guiding the films from the reels past the observation slot, an indicator with numbered dials for indicating the position of the pictures with respect to the said slot, and means for engaging the holes in the edge of one of the films for driving the indicator to correspond with the linear advancing movement of the films.

18. In a machine of the kind described, the combination of a casing, a pair of reels, films carried on said reels, means for driving the reels to wrap the films on either reel from the other, said casing having an observation point past which the films move, said films carrying indexed exhibits, an indicator with numbered dials, and means to contact with one of the films for driving the indicator proportionately with the linear movement of the films.

19. In a machine of the kind described, the combination of a casing, a pair of reels, films carried on said reels, means for driving the reels to wrap the films on either reel from the other, said casing having an observation point past which the films move, said films carrying indexed exhibits, a movable indicator frame supported on the casing with an indicator carried thereon having means for making contact with one of the films for driving the indicator proportionately with the linear movement of the films, said indicator frame having a pivotal connection to the casing enabling the same to swing out of the way to facilitate the placing of the films in the casing.

20. In a machine of the kind described, the combination of a casing, a pair of reels, films carried on said reels, means for driving the reels to wrap the films on either reel from the other, said casing having an observation point past which the films move, said films carrying indexed exhibits, an indicator frame pivotally mounted on the casing with an indicator carried thereby, said indicator having a sprocket wheel for engaging perforations in the edge of the film, said indicator frame operating to swing so as to remove the sprocket wheel from the path of the films.

21. In apparatus of the kind described, the combination of a casing, a stand, means for rotatably supporting the casing on the stand for rotation about a substantially horizontal axis enabling the casing to turn completely over on the axis of rotation, and enabling the casing to be held stationary in an inverted position, said casing having a sight opening in the wall thereof, a screen for receiving projected pictures, and means within the casing for supporting a plurality of films and for guiding the same in a substantially vertical direction past the said sight opening, the inverting of said casing operating to place the image in an upright position on the screen.

BROOKS B. HARDING.